US007266798B2

(12) United States Patent
Mansfield et al.

(10) Patent No.: US 7,266,798 B2
(45) Date of Patent: Sep. 4, 2007

(54) DESIGNER'S INTENT TOLERANCE BANDS FOR PROXIMITY CORRECTION AND CHECKING

(75) Inventors: Scott M. Mansfield, Hopewell Junction, NY (US); Lars W. Liebmann, Poughquag, NY (US); Azalia Krasnoperova, Mahwah, NJ (US); Ioana Graur, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 11/163,264

(22) Filed: Oct. 12, 2005

(65) Prior Publication Data

US 2007/0083847 A1 Apr. 12, 2007

(51) Int. Cl.
*G06F 17/50* (2006.01)
*G06F 9/455* (2006.01)

(52) U.S. Cl. ............................................ 716/11; 716/4
(58) Field of Classification Search .................... 716/5, 716/11, 20, 4
See application file for complete search history.

(56) References Cited

U.S. PATENT DOCUMENTS

| | | | |
|---|---|---|---|
| 6,553,559 B2 | 4/2003 | Liebmann et al. | |
| 6,578,190 B2 | 6/2003 | Ferguson et al. | |
| 6,871,338 B2 | 3/2005 | Yamauchi | |
| 2004/0133871 A1 | 7/2004 | Granik et al. | |
| 2005/0086618 A1 | 4/2005 | Ito et al. | |
| 2005/0142449 A1 | 6/2005 | Shi et al. | |
| 2005/0216877 A1* | 9/2005 | Pack et al. ...................... 716/19 |
| 2006/0085773 A1* | 4/2006 | Zhang ............................ 716/4 |
| 2006/0129966 A1* | 6/2006 | Rodin et al. ................... 716/19 |
| 2006/0136861 A1* | 6/2006 | Lucas et al. .................... 716/21 |

OTHER PUBLICATIONS

Title: OPC With A Conformal Target Layout Authors: Robert M. Lugg, Daniel F. Beale, Jason Huang, Michael L. Rieger Publication: Proc. SPIE vol. 4691, p. 1091-1096, Optical Microlithography XV; Anthony Yen; Ed. Publication Date: Jul. 2002.
Title: Impact Of Subwavelength CD Tolerance On Device Performance Authors: A. Balasinski, L. Karklin, V. Axelrad Publication: Proc. SPIE vol. 4692, p. 361-368, Design, Process Integration, and Characterization For Microelectronics; Alexander Starikov, Kenneth W. Tobin, Jr.; Eds. Punlication Date: Jul. 2002.

(Continued)

*Primary Examiner*—Paul Dinh
*Assistant Examiner*—Suresh Memula
(74) *Attorney, Agent, or Firm*—Todd M. C. Li

(57) ABSTRACT

A method of conveying the designer's intended electrical characteristics for a semiconductor design is provided by forming tolerance bands for a design layer of interest that take into consideration constraints from design layers that interact with and influence the features on the design layer of interest. The method determines regions, i.e. tolerance bands, within which the printed edges of features of the layer of interest will print within a predetermined criterion, and satisfy a variety of constraints, including, but not limited to, electrical, overlay and manufacturability constraints arising from the influence of features on other layers. The method may be implemented in a computer program product for execution on a computer system. The resulting tolerance bands can be used to efficiently convey the designer's intent to a lithographer, an OPC engineer or a mask manufacturer or tool.

36 Claims, 13 Drawing Sheets

OTHER PUBLICATIONS

Title: High-Performance Circuit Design For The RET-enabled 65nn Technology Node Authors: L. Liebmann, A. Barish, Z. Baum, H. Bonges, S. Bukofsky, C. Fonseca, S. Halle, G. Northrop, S. Runyon, L. Sigal Publication: Proc. SPIE vol. 5379, p. 20-29, Design and Process Integration For Microelectronic Manufacturing II, Lars W. Liebmann; Ed. Publication Date: 2004.

* cited by examiner

DESIGNER'S INTENT TOLERANCE BANDS FOR PROXIMITY CORRECTION AND CHECKING

FIELD OF THE INVENTION

The present invention relates to the manufacture of integrated circuits and a method for designing lithographic masks for use in the manufacture of integrated circuits. More particularly, the present invention relates to a method for obtaining tolerance bands for use in designing lithographic masks.

BACKGROUND OF THE INVENTION

As desired wafer level scaling continues to occur at a pace faster than improvements in lithographic equipment can be delivered, lithographers will have to implement patterning solutions based on decreasing image resolution. The lithographic process that transfers a pattern from a mask to a wafer includes process nonlinearities and it is the lithographer's responsibility to create a robust mask-to-wafer lithographic process in which the nonlinearities are stable over time. One technique that is used to help ease the burden placed on the lithographer is to restrict the variety of patterns that can be printed on any given level (Liebmann et al., High-Performance Circuit Design for the RET-enabled 65 nm Technology Node, in Design and Process Integration for Microelectronic Manufacturing II, Proc. of SPIE, Vol. 5379, 2004, pp. 20-29). This allows the lithography process to be more easily optimized. Unfortunately, this use of restricted design rules just transfers the burden from the lithographer to the designer, who now is left with the difficult task of redesigning layouts in a very restricted environment. Since it is very difficult for the lithographer to 1) predict what design geometries they may be asked to print and 2) know how well each geometry will print on the wafer, the lithographer will often attempt to impose severe restrictions on the designer. In this way, the lithographer can ensure that the relatively small variety of patterns will all print with sufficient process latitude. The drawback of this is that the designer is so severely restricted that it may no longer make sense to scale the design and the lithographer has often times disallowed geometries that could be printed without trouble. This problem is confounded by the fact that the designer and the lithographer often do not understand each others needs and don't share common terminology that would better facilitate the required communication.

It is the role of the optical proximity correction (OPC) engineer to try to resolve these disparities and find a compromise solution. The OPC engineer's role is to modify the design shapes prior to mask build in order to account for process nonlinearities. The lithographer's requirements are often communicated to the OPC engineer through a process model and a set of process requirements. Lithography simulation software can then be used by the OPC engineer to simulate the lithography process, giving the OPC engineer a very detailed understanding of the lithographic process. Although OPC engineers have all the tools they need to determine whether a geometry will cause problems in lithography, the design rules must still be restricted in order to keep designers from using these geometries.

In addition, the focus of OPC to date has been to accurately replicate the designed layout patterns on the wafer under nominal imaging conditions. As lithography is being pushed closer to fundamental resolution limits, it is becoming increasingly important to balance patterning accuracy at nominal conditions against patterning robustness over a range of process variations. Commonly referred to as process window optimization, the goal is to maximize the range of dose and defocus over which acceptable image tolerances can be maintained. Key to process window OPC (for example, see U.S. Pat. No. 6,578,290 to Ferguson et al., and Lugg et al., Adaptive OPC with a conformal target layout, Proc. SPIE Vol. 4691, p. 1091-1096, Optical Microlithography XV, July, 2002.) is an accurate and efficient means of communicating acceptable image tolerances from the designer to the lithographer. While it is theoretically conceivable to judge acceptable imaging by doing device and circuit simulations on the predicted patterning results (Balasinski et al., Impact of subwavelength CD tolerance on device performance, Proc. SPIE, Vol. 4692, p. 361-368, Design, Process Integration, and Characterization for Microelectronics, July 2002.), these techniques do not lend themselves to the high speed geometrical manipulations necessary for practical OPC or model-based process window analysis on large integrated circuit designs. It is therefore desirable to communicate to the lithographer the designer's intent and acceptable image tolerances geometrically while efficiently capturing complex inter-and intra-design level dependencies.

Currently, designers already convey many of their requirements to the OPC engineer through a set of design layers. Typically, each design layer contains a logical grouping of shapes; for example, of shapes that correspond roughly to a lithographic mask which is used to image and/or print a set of features on the wafer. For example, one layer may represent the shapes corresponding to the active areas, another layer of shapes corresponds to conductive lines, such as polysilicon gate conductor lines, while yet another layer corresponds to contact shapes, and so on. However, the term "layer" is not limited to a physical layer on the wafer, but may also refer to any logical grouping of shapes on a plane. Thus, a physical layer on the wafer or a particular mask design may correspond to shapes existing on multiple logical "layers." Currently, these layers are processed independently and OPC is required to strictly replicate each of the layers in the final wafer printing. Although some inter-level checking is done to try to determine which areas of the design are more important than others, this checking is very limited and very rudimentary. Since the OPC engineer must replicate the design exactly as it is drawn, the additional information contained in the relationships between layers can never be used. However, if OPC engineers had the freedom to adjust the design without changing the functionality, they would have the ability to determine the optimal geometries for lithography. In this way, the designers' desired functionality can be achieved, while removing all conditions that will cause problems in the lithography process.

In view of the above, there is a need in the semiconductor industry to provide an improved method of designing lithographic masks that permits optimization of the mask layout and achieves maximal process windows without unduly restricting the rules of the circuit design.

SUMMARY OF THE INVENTION

This invention creates a band that represents acceptable locations for edges that are printed on the wafer for each mask layer. These bands are meant to convey the designer's intended electrical functionality and characteristics of the design for the patterns on the layer of interest. This intended functionality is determined by examining both the current layer and layers that either geometrically or functionally interact with or influence the current layer. The tolerance region, or tolerance band, for the current layer is determined by accounting for constraints from adjacent layers, as well as constraints within the current layer of interest. In their simplest form, the constraints from adjacent layers can be determined by considering overlay tolerances between layers and size variation tolerances within a layer. Once these variations in the adjacent layers are accounted for, the current layer is allowed to occupy all remaining space while observing the appropriate intersection or separation rules. Further intra-level restriction of the tolerance band is also required to ensure desired electrical performance is met, mask manufacturing constraints are adhered to and pattern integrity is maintained through subsequent process steps (e.g. etch). These tolerance bands are then used for Model Based Optical Proximity Correction (MBOPC) or post OPC verification (also known as optical rules checking (ORC)) to provide feedback as to whether or not the desired patterns will be printed on the wafer with acceptable fidelity. The ORC and MBOPC steps may incorporate process variation to find distributions of edge placements, comparing those distributions to the desired tolerance bands. Finally, the computed edge distributions may be converted into shapes for further analysis of shape sizes or areas. In this way, further checks of the designer's intended electrical characteristics can be made and other yield analysis can be performed.

According to one aspect of the present invention, a method of designing a mask layout is provided including the steps of: providing a circuit design comprising a plurality of design layers comprising features arranged on a two-dimensional plane, said design layers aligned to one another along a third dimension; identifying a selected one of said plurality of design layers including a critical feature to be formed on a substrate; identifying a constraining region associated with an influencing feature on one of said plurality of design layers different than said selected design layer, wherein said influencing feature interacts with said critical feature, said constraining region being associated with one or more constraints; and determining a tolerance band associated with said critical feature, wherein said tolerance band defines a region within which said critical feature when formed on the substrate would satisfy a predetermined criterion, and wherein said tolerance band comprises an edge that is constrained in accordance with said one or more constraints associated with said constraining region. The method may be implemented in a computer program product. In yet another aspect of the invention, the method may include providing a service of defining or delivering the circuit designer's intent by providing tolerance bands formed according to the inventive method to a lithographer, an OPC engineer, or a mask manufacturer.

BRIEF DESCRIPTION OF THE DRAWINGS

Referring to the exemplary drawings wherein like elements are numbered alike in the several Figures.

DETAILED DESCRIPTION OF THE INVENTION

The present invention will now be described in greater detail by referring to the following discussion with reference to the drawings that accompany the present application. It is observed that the drawings of the present application are provided for illustrative purposes and thus they are not drawn to scale.

This invention involves the creation of tolerance bands, which is the band or region within which the printed edges of a shape, may vary from the designed edges of shapes and still meet various specifications, such as performance and manufacturability specifications. In accordance with the present invention, the maximum and minimum boundaries of these tolerance regions for shape edges on a given physical layer of an IC layout are constrained by interaction with features on other layers, including, but not limited to such factors as overlay tolerance and geometric constraints based on process conditions. These tolerance bands can be created using a series of inter-layer and intra-layer checks to determine valid locations for the placement of pattern edges.

Figure 1:
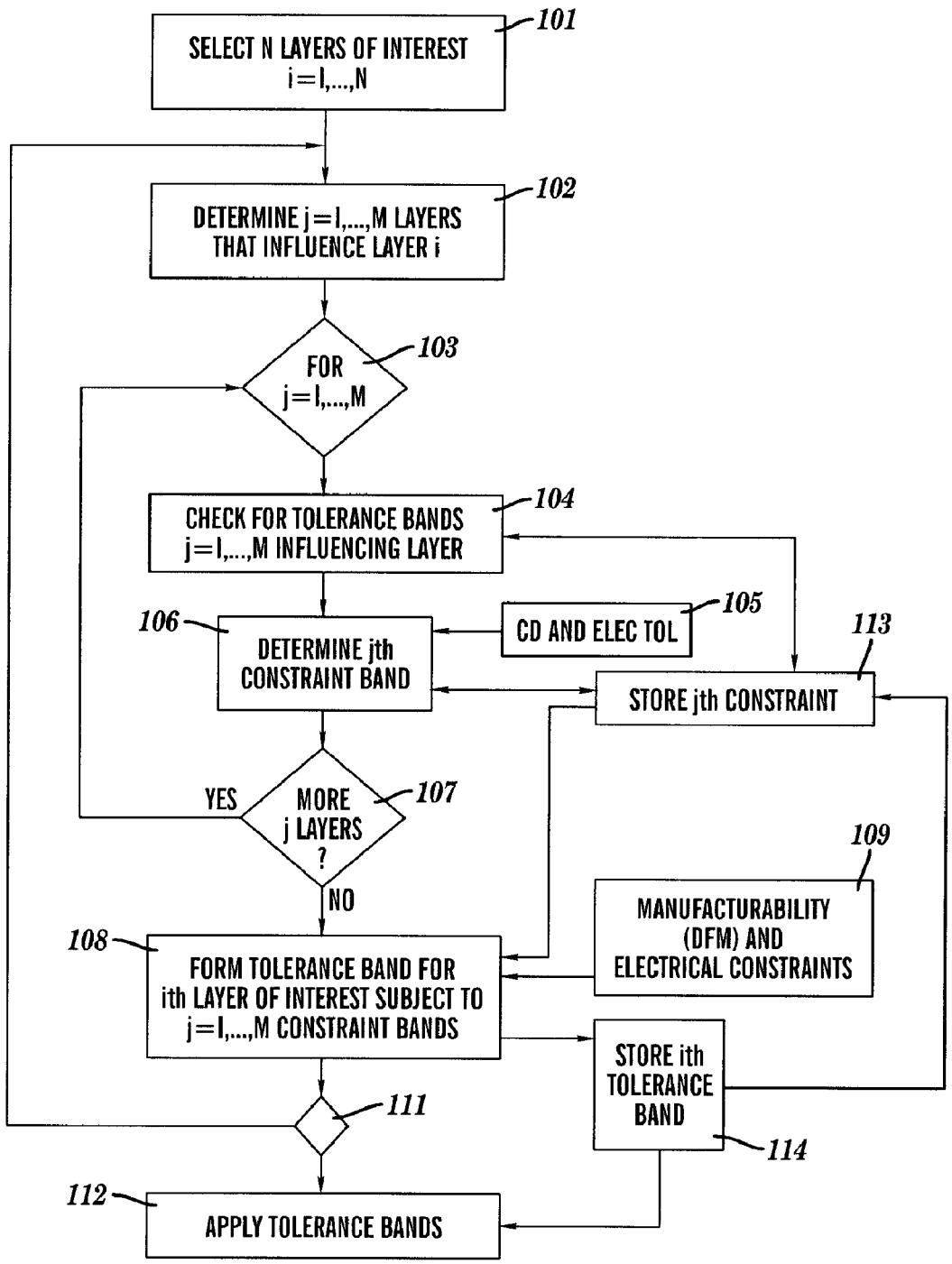
FIG. 1 is a flow diagram illustrating one embodiment of the inventive method.
Figure 2:
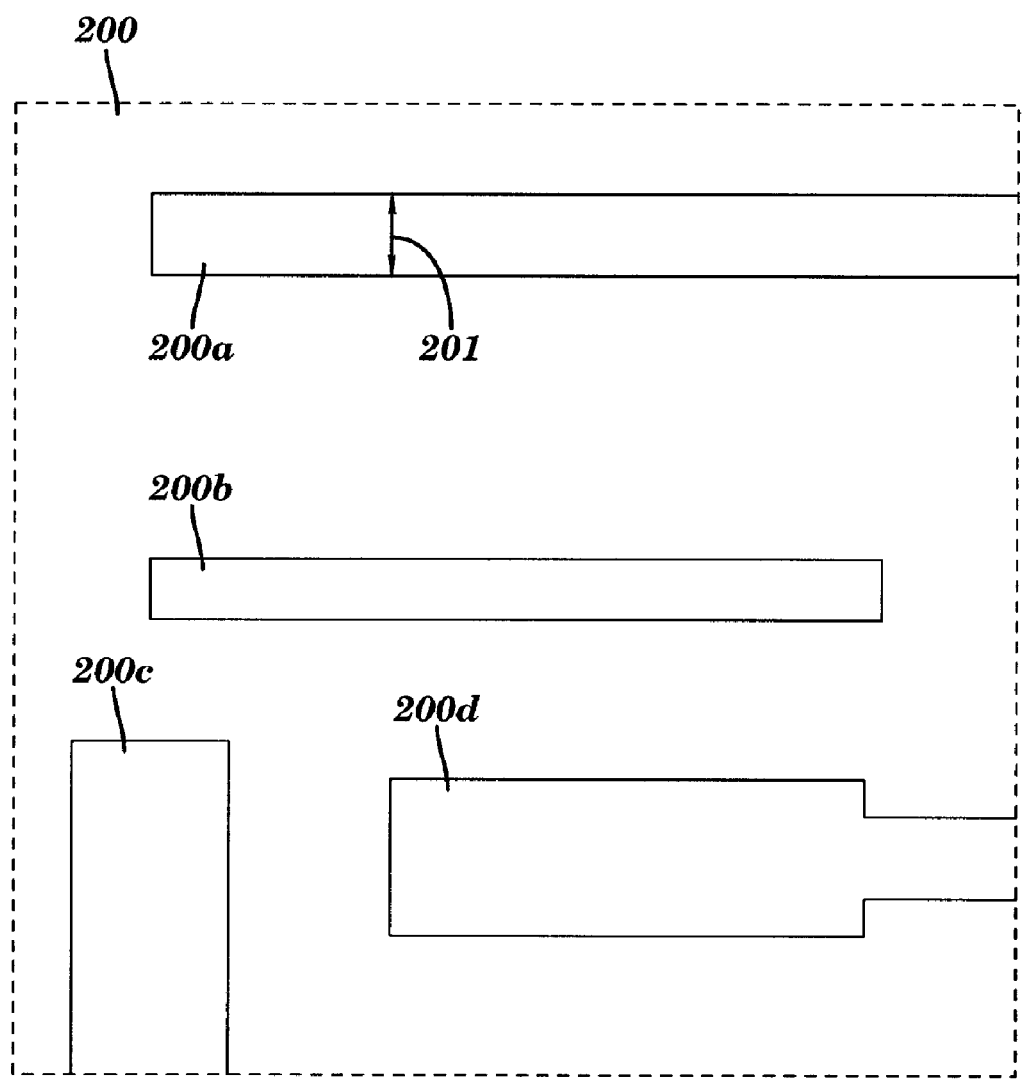
FIG. 2 is a plan view showing the layout of features on a design layer of interest.
Figure 3:
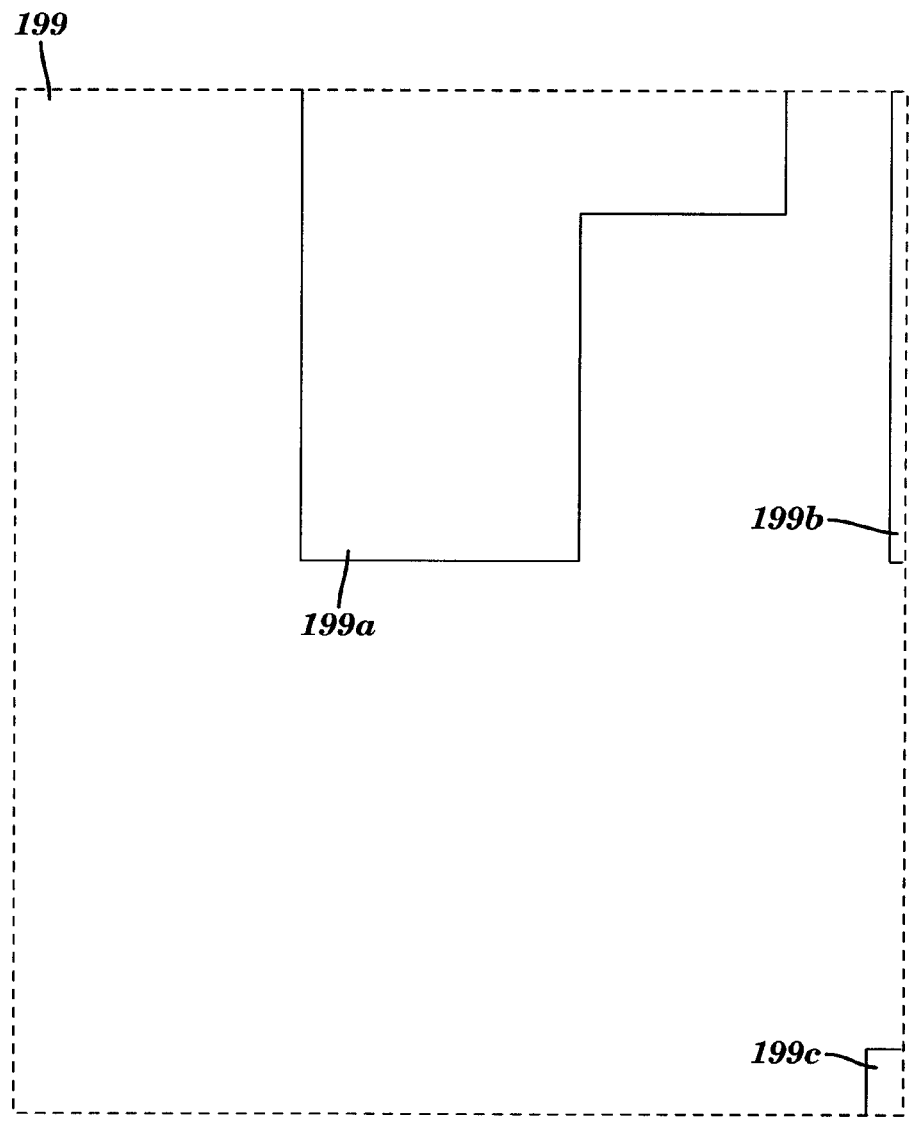
FIG. 3 is a plan view showing the layout of features on a first influencing design layer that influences the features on the layer of interest.

A preferred embodiment of the invention is illustrated in FIG. 1 and described here. The inventive flow is performed for the most critical layers, i=1, . . . , N, in the design (Block 101). Typically, there may be N=4 or 5 of the most critical layers. For example, a critical layer may be one containing shapes that are critical, preferably, to the performance of the integrated circuit as a whole, for example, the size and location of polysilicon gates, contacts and metal wires have direct impacts on the performance of the circuit. Preferably, the most critical layers are selected as those having the most significant impact on the performance of the circuit as a whole. For each of the critical layers of interest, the corresponding constraining layers, j=1, ..., M, that will influence the tolerance for the ith layer of interest are determined (Block 102). In general, these constraining layers will be the layers that contact or physically influence the ith critical layer of interest. In some cases other layers that do not make physical contact with the layer of interest may also be included as constraining layers. This would be the case if there was potential for capacitive coupling between two layers, for example. The layers that must be considered for the analysis of the critical layer of interest are considered the "constraining layers" for the layer of interest.

For each jth constraining layer (Block 103), a check is made (Block 104) to see if a tolerance band for that jth constraining layer has already been formed. This may be done by any method now known or developed in the future, for example, by temporarily storing information related to previously processed layers in a temporary storage area or local cache 113. If a tolerance band has not previously been formed for the constraining layer, then a nominal tolerance band for that constraining layer is created, for example, using the nominal process bias, the critical dimension (CD) tolerance and electrical tolerances for that layer (Block 105). In this example, the inner and outer boundaries of the tolerance bands of each jth constraining layer may then be used as constraints on the tolerance bands of the ith layer of interest. In other cases, different constraints may be defined within different regions of the tolerance bands of the constraining layer, as discussed further below. As the tolerance bands for each jth constraining layer are created, they may be cached in local storage 113 for use with other layers of interest. The tolerance band for the constraining layer is then converted into a "constraining band" (Block 106) by adding in an overlay tolerance, which may have several components, including: the lithographic overlay tolerance, additional geometric constraints based on process integration schemes (e.g. sidewall spacers) and also any capacitive constraints between layers. Both constraining and tolerance bands are closed shapes that have outer and inner edges that typically enclose the nominal edges of the designed feature shape.

Once all M constraining layers have had their constraining bands computed for the ith layer of interest (Block 107), the tolerance band for the ith layer of interest may be determined, for example, by growing the tolerance bands of the ith layer features using the constraining bands of the M constraining layers to limit the extent (e.g. the maximum outer boundary) of the tolerance bands for the features on the ith layer of interest. This can be accomplished using various rules-based operations on copies of the ith layer-of-interest's designed shapes and the constraining bands from shapes on the M constraining layers.

One exemplary embodiment of the inventive method includes starting with the designed shapes for the layer of interest, for example, by making a temporary copy of the initial shapes onto the same plane as the appropriate constraining bands, and then expand the boundaries of the initial shapes until the edges of those shapes contact an outer edge of a constraining band (Block 108). Electrical and manufacturability (or design for manufacturability, DFM) rules may be applied as additional constraints (Block 109) to further limit the extent of these outer tolerance edges.

Likewise, the initial designed shapes are also copied and shrunk until they contact the edge of a constraining band. Depending on the constraints between the ith layer of interest and the jth constraining layer, the shapes will be shrunk until they hit either the outer edge or the inner edge of the constraining band. Electrical and DFM constraint rules may then be applied to further limit the inner tolerance edges of the shapes of the ith layer of interest. The resulting tolerance bands for the ith layer are then saved (Block 114), for example, persisting as a tolerance layer for the ith layer of interest in subsequent OPC processing. The resulting tolerance bands of the ith layer may also be considered in creating the constraint bands for the next ith+1 layer of interest, for example, by saving the ith tolerance band layer to the local cache.

The process described (Blocks 101-110) for the ith layer of interest is then repeated (Block 111) for all remaining layers of interest to be analyzed. When tolerance bands for all N layers of interest have been computed, the creation of the tolerance bands is complete (Block 112).

An example of the result of this process flow on an example portion of a logic circuit design is shown in FIGS. 2-7. For example, referring to FIG. 2, which illustrates a top down view of a portion 200 of a circuit layout for the ith critical layer 200 which, in this example, contains polysilicon conductor (PC) or poly gate layer shapes 200a-200d, which includes shapes representing gate conductors. Layers that are the most critical for determining how to print PC features act as constraining layers for the ith layer of FIG. 2, and include the corresponding portion of the jth layer 199 illustrated in FIG. 3, containing shapes representing the active areas (RX) 199a-199c. The features 200a-200d of the PC layer 200 would overlay and contact features of the active area layer 199 in this example. The j+1 layer 203 illustrated in FIG. 4, contains shapes representing contact areas (CA) 203a-203f, which represent features that will physically contact features on the PC layer 200 or the RX layer 199 when printed on the wafer.

Figure 5:
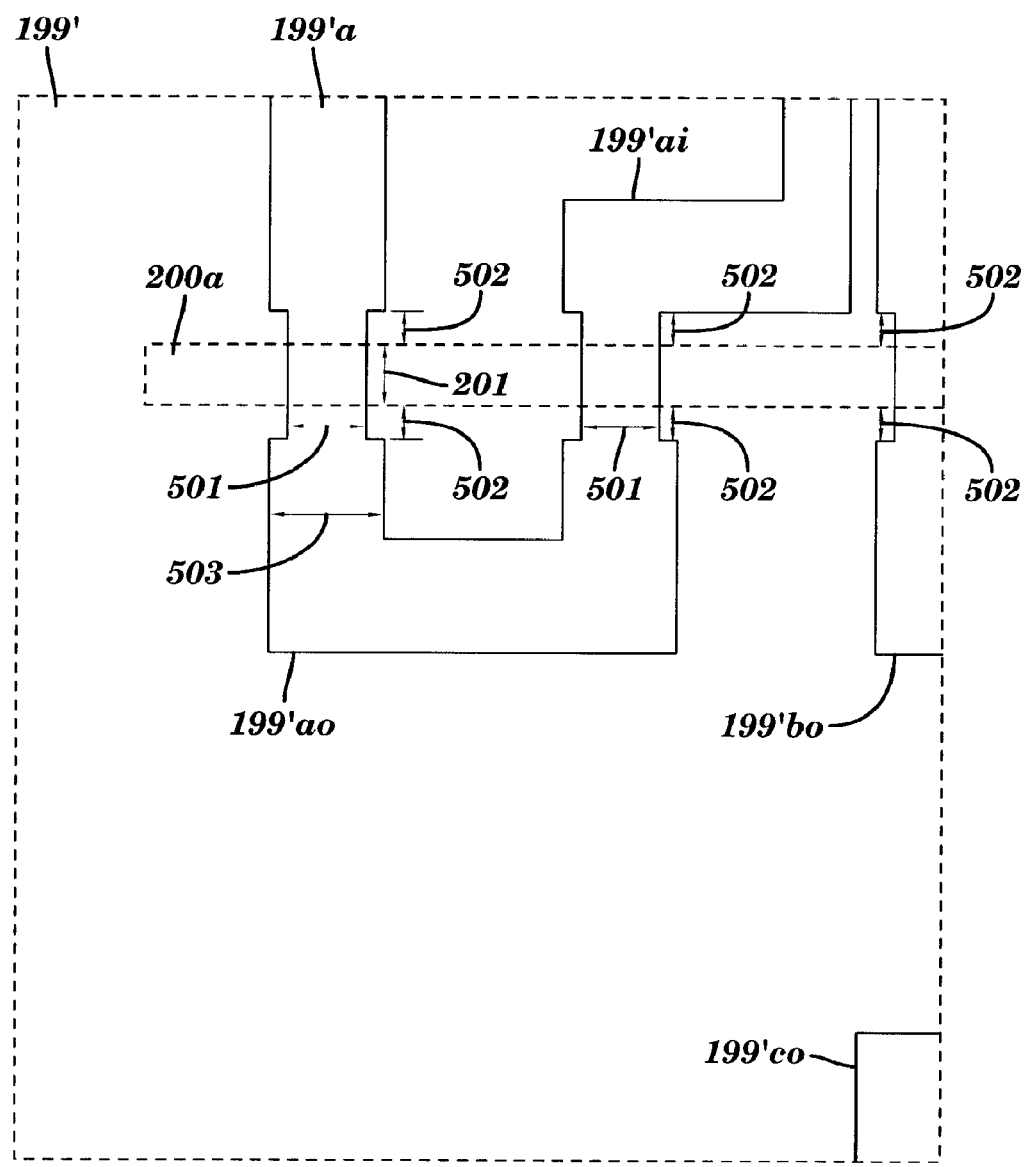
FIG. 5 is a plan view showing constraint regions associated with the features of FIG. 4 on the second design layer that influences the features on the layer of interest.

According to one embodiment of the present invention, constraining bands are created based on shapes in the RX and CA layers that incorporate overlay tolerance and nominal CD tolerance. Referring to FIG. 5, constraint bands based on RX features 199a-199c of RX layer 199 are created as a jth layer of constraint shapes 199' (see FIG. 3). In this example, the inner and outer constraint boundaries 199'ai and 199'ao-199'co (where the designation "i" indicates the inner constraint boundaries and "o" indicates outer constraint boundaries), respectively, represent the inner and outer limit of tolerance within which the corresponding active area features (e.g. 199a-199c from FIG. 3, respectively) may be printed on the wafer and meet specifications. This includes both the printed size of the feature which in a typical example is about 10% of nominal, and also overlay tolerance, which indicates the relative position of the printed patterns relative to the nominal design location. The tolerance band may also account for other process steps, for example, to account for the presence of other features encountered during processing, such as a sidewall spacer, or to provide for device bias compensation. Where RX does not intersect with a PC line, the RX tolerance band has a width 503. However, where the RX and PC line intersect, a tighter CD tolerance, i.e. RX tolerance width 501, which is smaller than the normal RX width 503, has been placed on the RX region 199'a that is close to a PC line (dashed shape 200a having PC width 201, overlain from PC layer 200 of FIG. 2) to account for the tight control required on transistor gates. The RX tolerance region for which tighter CD control is required, is determined by finding where PC crosses RX (e.g. along nominal PC width 201) and then expanding that RX tolerance region along the PC width direction by an additional RX tolerance extension 502, for example, including the PC CD tolerance plus the PC to RX overlay tolerance.

Figure 4:
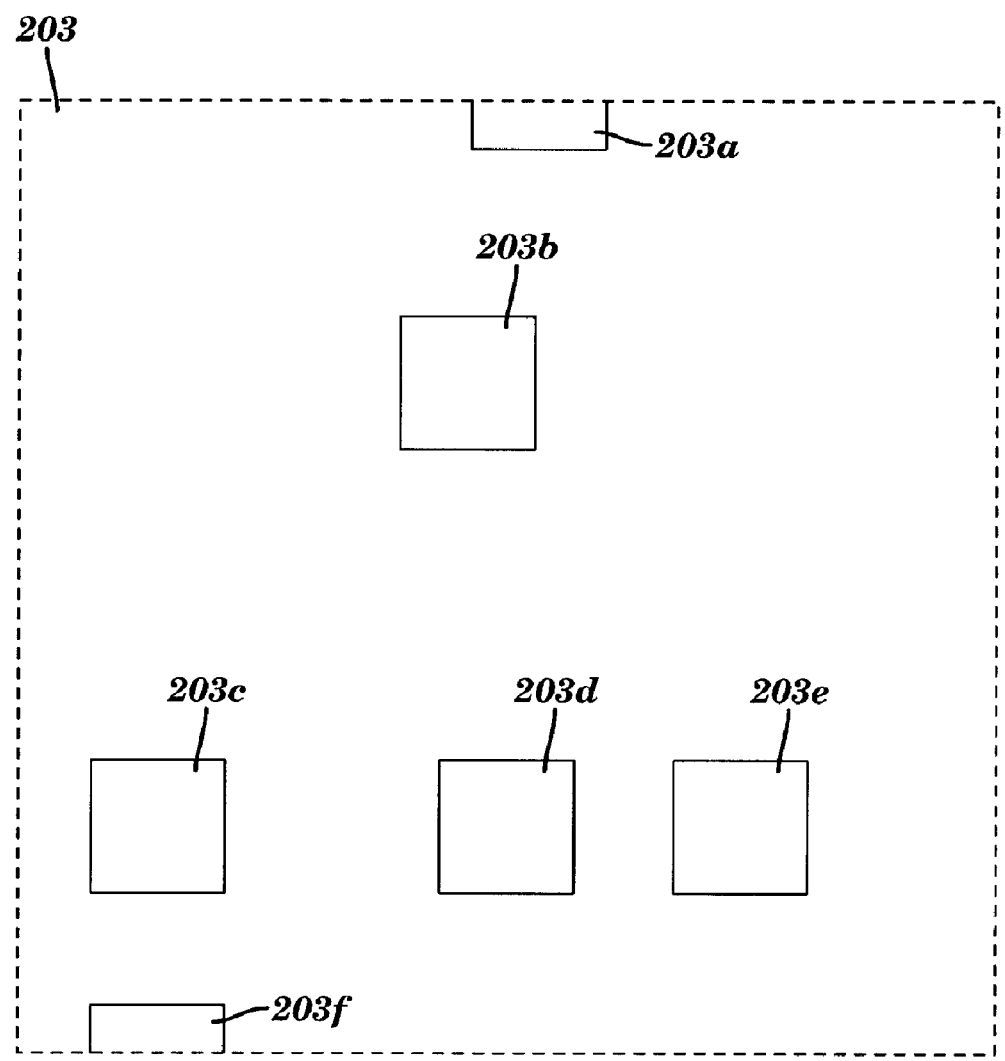
FIG. 4 is a plan view showing the layout of features on a second design layer that influences the features on the layer of interest.
Figure 6:
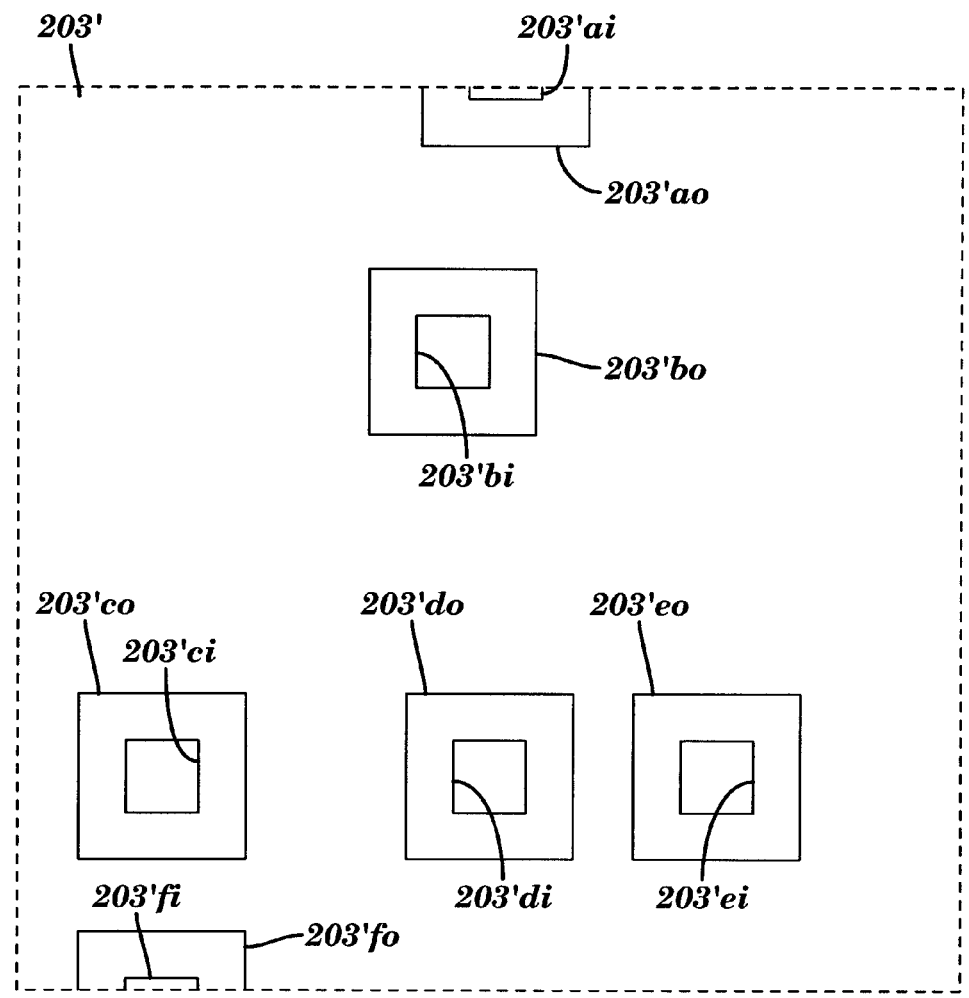
FIG. 6 is a plan view showing constraint regions associated with the features of FIG. 3 on the first design layer that influences the features on the layer of interest, including constraints on the features of the design layer of interest.

Another j+1 constraining layer 203' is illustrated in FIG. 6, where constraint bands based on CA features 203a-203f of CA layer 203 are created as a jth layer of constraint shapes 203' (See FIG. 4). In this example, outer constraint boundaries 203'ao-203'fo represent the outer limit of tolerance within which the corresponding contact features (e.g. 203a-203f from FIG. 4, respectively) may be printed on the wafer and meet specifications. The inner constraint boundaries 203'ai-203'fi represents the minimum area of the contact features 203a-203f that is required for the contact to have adequate electrical conductivity to the PC wire, taking into account both CD tolerance and overlay tolerance. Therefore, the inner constraint boundaries 203'ai-203'fi of the contact features 203a-203f must be enclosed by the printed PC shapes.

In this example, the number of constraining layers M is two, i.e. the CA constraining layer 203' corresponding to CA layer 203 and the RX constraining layer 199' corresponding to RX layer 199. After forming the constraint bands or boundaries (Block 108 of FIG. 1), then the tolerance bands of the ith layer of interest, in this example, PC layer 200, is formed, according to the present embodiment, subject to the constraints of the M constraining layers (e.g. layers 203' and 199'). For example, this may be done by superimposing onto the same plane, the constraining shapes and boundaries corresponding to the CA layer 203' and the RX layer 199' and the shapes of PC layer 200.

Figure 7A:
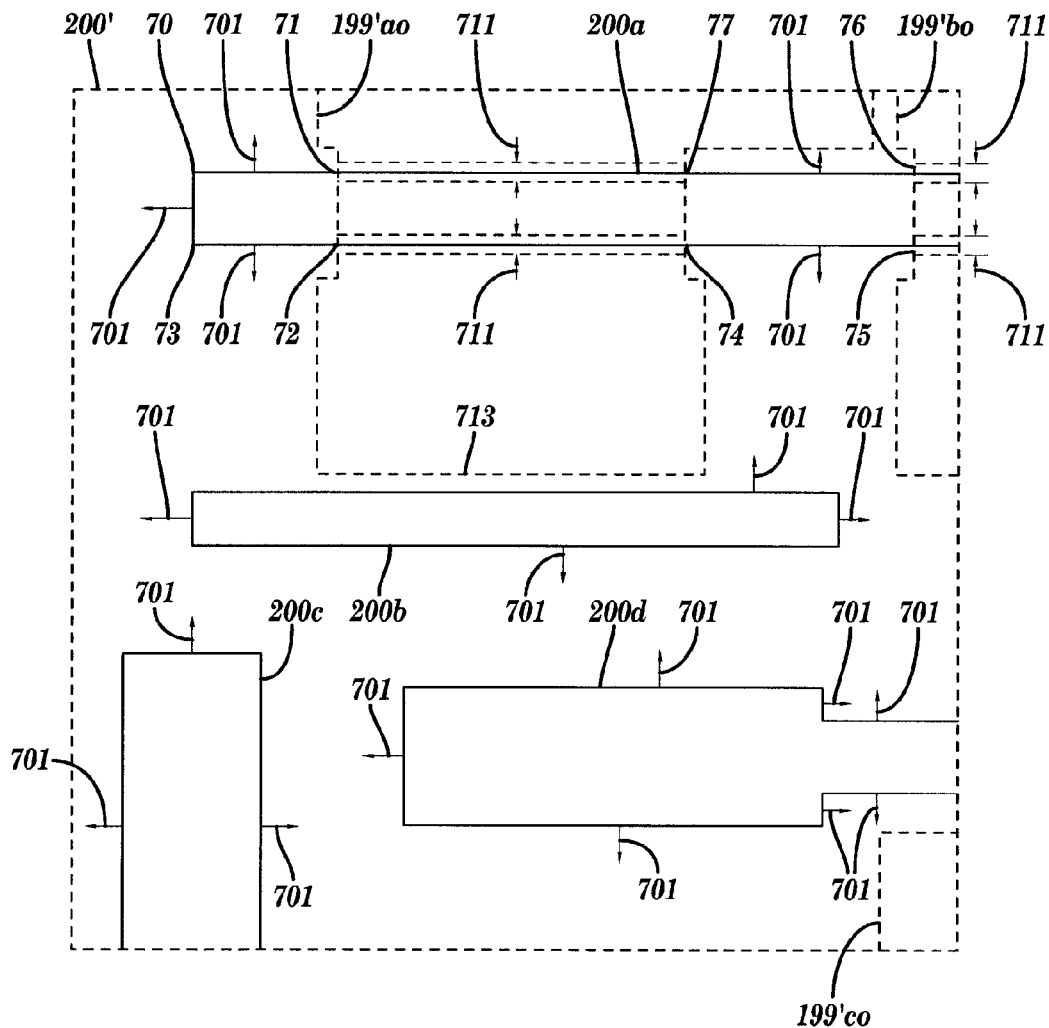
FIG. 7A is a plan view showing the formation of tolerance bands for features on the design layer of interest, constrained by constraint regions of FIG. 6 associated with the features of FIG. 3 on the first influencing design layer.

Referring to FIG. 7A, in this case, the PC shapes 200a-200d are used as starting shapes to create the PC tolerance band on a PC tolerance layer 200'. For illustration purposes, the outer constraint boundaries 199'ao, 199'bo and 199'co of RX are superimposed on the same plane 200' as the shapes 200a-200d of the PC layer 200. In accordance with the invention, different constraints or rules may be applied to the formation of the tolerance bands. For example, to form the outer boundary of the tolerance band for portions of a PC wire shape that do not lie over an RX layer, the edges of the PC shape may be expanded outward. For example, PC shapes 200b, 200c, 200d and portions of 200a (specifically edge segments 70-71, 70-73, 73-72, 77-76 and 74-75), do not intersect RX regions. Thus, the corresponding edges of PC shapes that are outside of RX, specifically shapes 200b, 200c, 200d and edge sections 70-71, 70-73, 73-72, 77-76 and 74-75 of PC shape 200a, may be expanded outward, as indicated by arrows 701, until they either 1) come within a manufacturing constraint of another PC shape, such as, for example, referring to FIG. 7C, the distance 715 between PC outer tolerance boundaries 200'co and 200'bo, 2) hit an outer boundary of an RX constraining band, such as, for example, the lower edge 713 of the RX constraint boundary 199'ao, or 3) reach a maximum dimension, which, for example, may be based on electrical constraints, or may be based on a maximum wire width 708 (see FIG. 7C).

For the portions of the PC shapes that intersect the RX constraint regions within the outer boundaries of the RX constraining bands, the PC tolerance band is tightly constrained by a predetermined amount 711 (see FIG. 7C) based on a minimum allowable gate length. For example, the tight tolerance on PC across the RX is to control and minimize leakage current that is associated with small transistor gate lengths (typically, nominal gate lengths are equal to nominal PC width 201), and to control and minimize variations in transistor speed caused by gate length errors. For example, if the width of PC is too small, the transistor leakage current will be too high. It is generally preferred to have good control over the PC width (i.e. gate length) to maintain constant device speed; if PC width varies significantly across the chip, then the speed of the transistors will be similarly variable across the chip. In this example, the edge portions of PC shape 200a that intersect the outer constraint boundary 199'ao between points 71-77 and 72-74 are subject to such tight constraints 711.

Figure 7B:
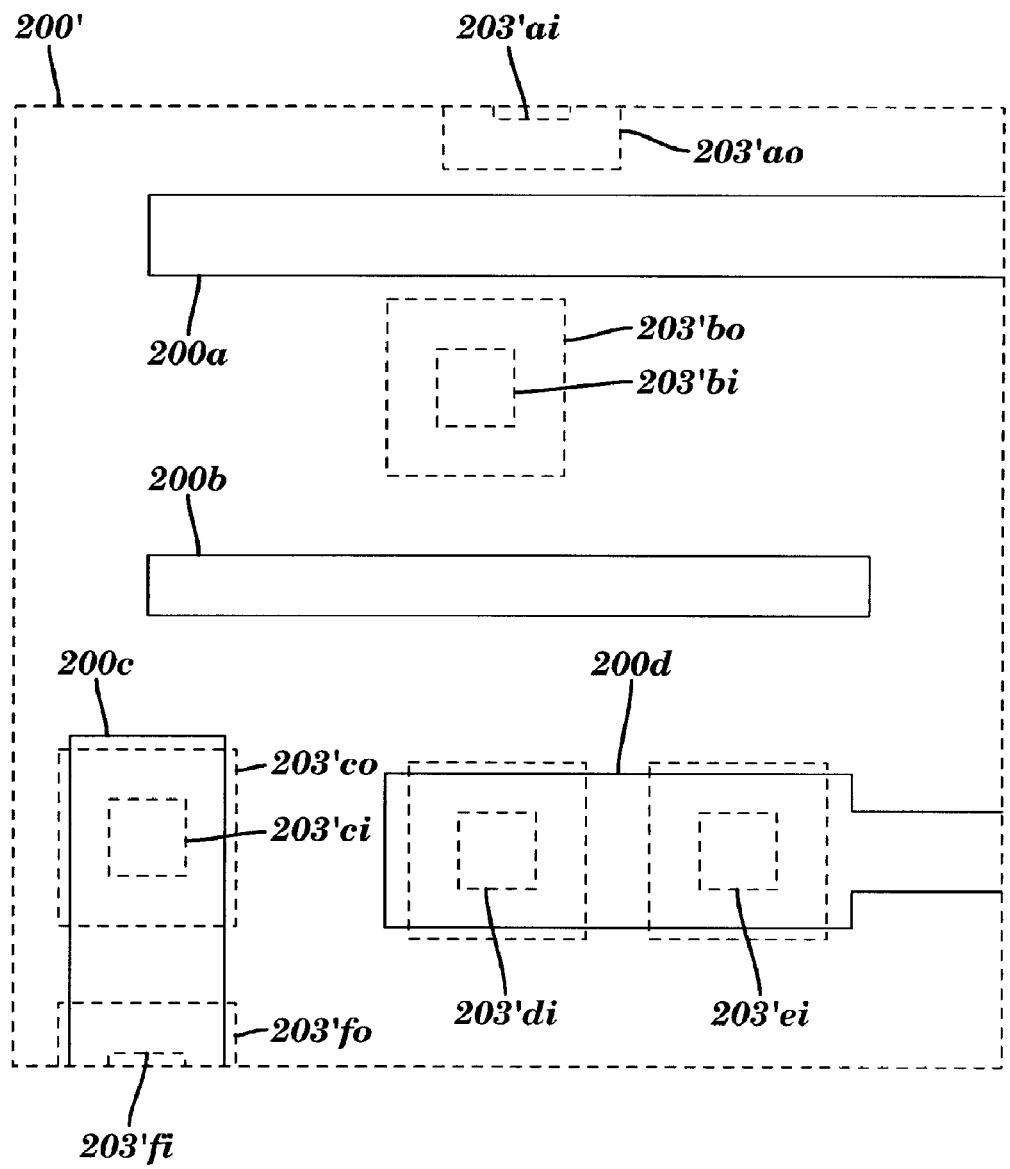
FIG. 7B is a plan view showing the formation of tolerance bands for features on the design layer of interest, constrained by constraint regions of FIG. 5 associated with the features of FIG. 4 on the second influencing design layer.
Figure 7C:
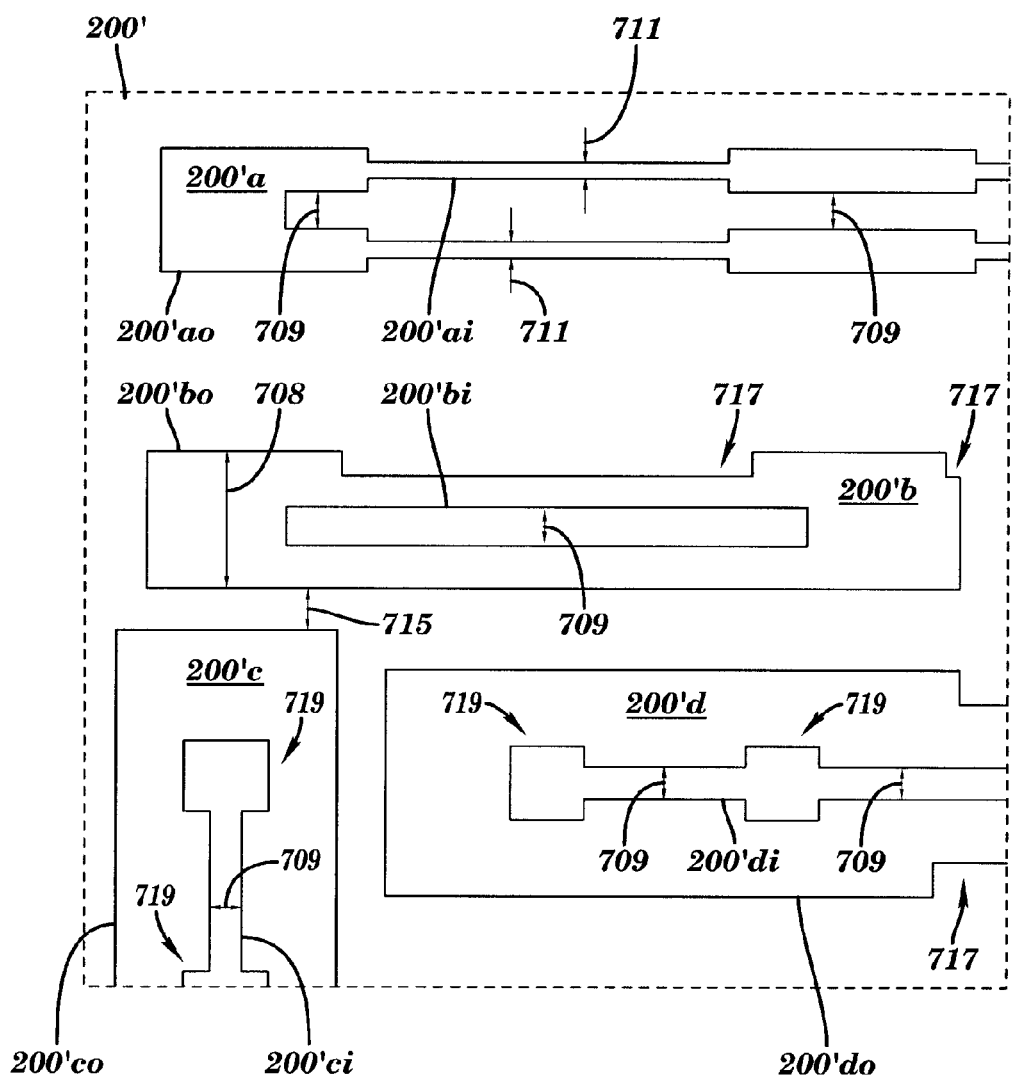
FIG. 7C is a plan view showing the resulting tolerance bands for features on the design layer of interest, constrained by constraint regions of the first and second influencing layers, as well as CD, manufacturability or other constraints on the design layer of interest.

On the other hand, referring to FIG. 7C, where the PC wire does not cross RX, the inner boundaries 200'ai, 200'bi, 200'ci and 200'di of the PC wire tolerance band are set to a minimum value based on a manufacturing constraint or minimum allowable wire error 709, so that the PC line will not become too narrow.

Referring to FIG. 7B, the PC tolerance plane or layer 200' is shown including superimposed CA constraint boundaries 203'ai-203'fi and 203'ao-203'fo from the CA constraint layer 203'. Here, the superimposed RX constraint boundaries illustrated in FIG. 7A are not shown for clarity, but will be used together with the superimposed CA constraint boundaries to determine the PC layer tolerance bands, in accordance with the invention. In this example, the inner constraint CA boundaries 203'ci and 203'fi are designed to overlay PC shape 200c, and 203'di and 203'e CA boundaries are designed to overlay PC shape 200d. The inner constraint boundaries 203'ci, 203'fi, 203'di and 203'ei define the minimum CA area that must be enclosed by the printed PC shapes 200c, 200d, respectively. Thus, the inner edges of the tolerance band for PC shapes 200c and 200d must not encroach the inner constraint boundaries 203'ci, 203'fi and 203'di, 203'ei, respectively. Thus, in this example, the inner edges of the PC tolerance bands 200'ci and 200'di include "hammerhead" shapes 719 shown in FIG. 7C that enclose the associated minimum CA areas.

The resulting PC tolerance band layer 200' formed in accordance with the invention is illustrated in FIG. 7C. The tolerance bands 200'a, 200'b, 200'c, 200'd correspond to the PC shapes 200a, 200b, 200c and 200d, respectively. The resulting tolerance band 200'a associated with PC shape 200a is broader for portions of PC shape 200a that extend outside of the RX outer constraint boundary 199'ao, but within that boundary, the PC tolerance band 200'a conforms to the minimum allowable PC gate error 711. For PC shape 200b, the corresponding tolerance band 200'b has an inner boundary 200'bi that conforms to the minimum manufacturable wire error 709, while also conforming to the maximum PC wire error 708. The outer boundaries of the PC tolerance bands will not encroach on the RX regions 199'ao, 199'bo and 199'co, as indicated by notches 717 in the outer boundaries 200'bo and 200'do. In the case of the tolerance bands for PC shapes 200c and 200d, the resulting tolerance bands enforce a minimum CA area that must be covered by the printed PC, indicated by widened inner tolerance regions 719, as well as conforming to the minimum manufacturable wire error 709. In addition, the PC shapes will not encroach each other within a minimum tolerance distance 715.

Figure 8:
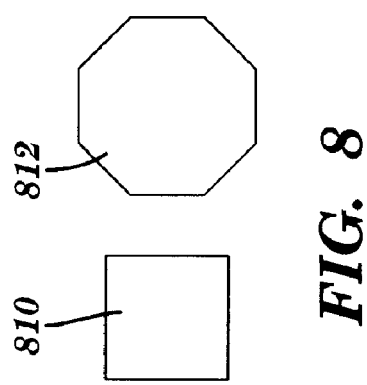
FIG. 8 is a plan view showing a smoothed version of a constraint region.

The present invention is not limited to the orthogonal shapes illustrated in the embodiments discussed above. Orthogonal, or right angle polygons, are typically used due to ease of manufacturability. However, it is known that during processing, the resulting images do not have orthogonal geometries. Designers may make assumptions regarding the expected shapes resulting from the imaging process when building their electrical models. For example, referring to FIG. 8, electrical simulations for a CA contact 810 assume that the contact is round, even though it is drawn as a square. To obtain a more accurate tolerance band that is more representative of the expected printed shape, it may be desirable to smooth or round the corners of a designed orthogonal shape, for example, for all critical shapes. For example, a contact constraining band may be better represented by a smoother shape such as a beveled CA 812. Alternatively, it may be desirable to pre-convolve the designed shapes with a smoothing kernel. Other smoothing operations may be suitable to provide a better representation of the actual printed shapes in the constraining or tolerance bands. In this example, the PC wire tolerance band will be required to capture or enclose the minimum beveled CA constraining band 812.

Figure 9:
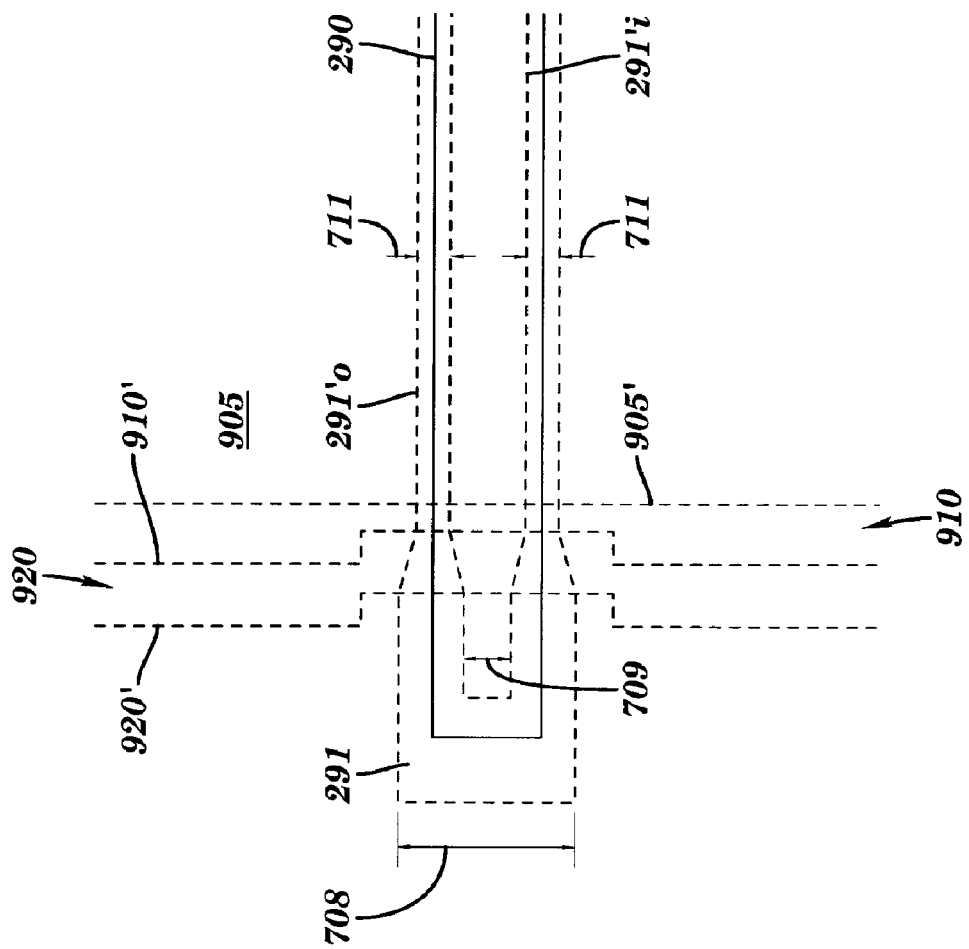
FIG. 9 is a plan view of a tolerance band formed when the contraints vary within the constraining regions.

It may also be desirable to account for the statistical nature of overlay, CD or other process variations. In this case, the region reserved for overlay variation between two layers may be modified to account for these statistics. For example, referring to FIG. 9, consider a portion of a nominal PC shape 290, where it crosses a portion of a nominal RX shape 905 having outer boundary 905'. Here, a portion of the outer edge of the RX CD tolerance band 910 is represented by the boundary 910'. The corresponding outer boundary of the RX to PC overlay tolerance 920 is represented by the boundary line 920'. Within the interior of the RX shape 905, the PC tolerance band is tightly constrained to a tight gate tolerance 711 within the RX CD constraint band 905. However, with increasing distance from outside of the RX CD tolerance band 905' towards the RX to PC overlay tolerance boundary 920', the critical portions of the PC and RX shapes will be less likely to be printed within the expected process variations. Thus, the PC tolerance band 291 may be looser, or wider, as the distance from the RX CD tolerance band 910' increases. One approach for doing so is to taper the tolerance bands for each layer across the overlay region with adjacent layers. In doing so, the tolerance band is tightest in the region where overlay variation is most likely and looser in regions where the overlay variation is less likely. For example, the PC tolerance band 291, having inner boundary 291'$i$ and outer boundary 291'$o$, may be tapered between the tight gate tolerance 711 within the RX CD constraint band 910 and the looser wire tolerance 709 and 708 in the RX-PC overlay tolerance region 920 between the outer RX-PC overlay boundary 920' and the outer boundary 910' of the RX CD constraint band 910. It is recognized that alternative tapering methods could be employed besides a straight linear taper across the overlay tolerance region (920).

Figure 10:
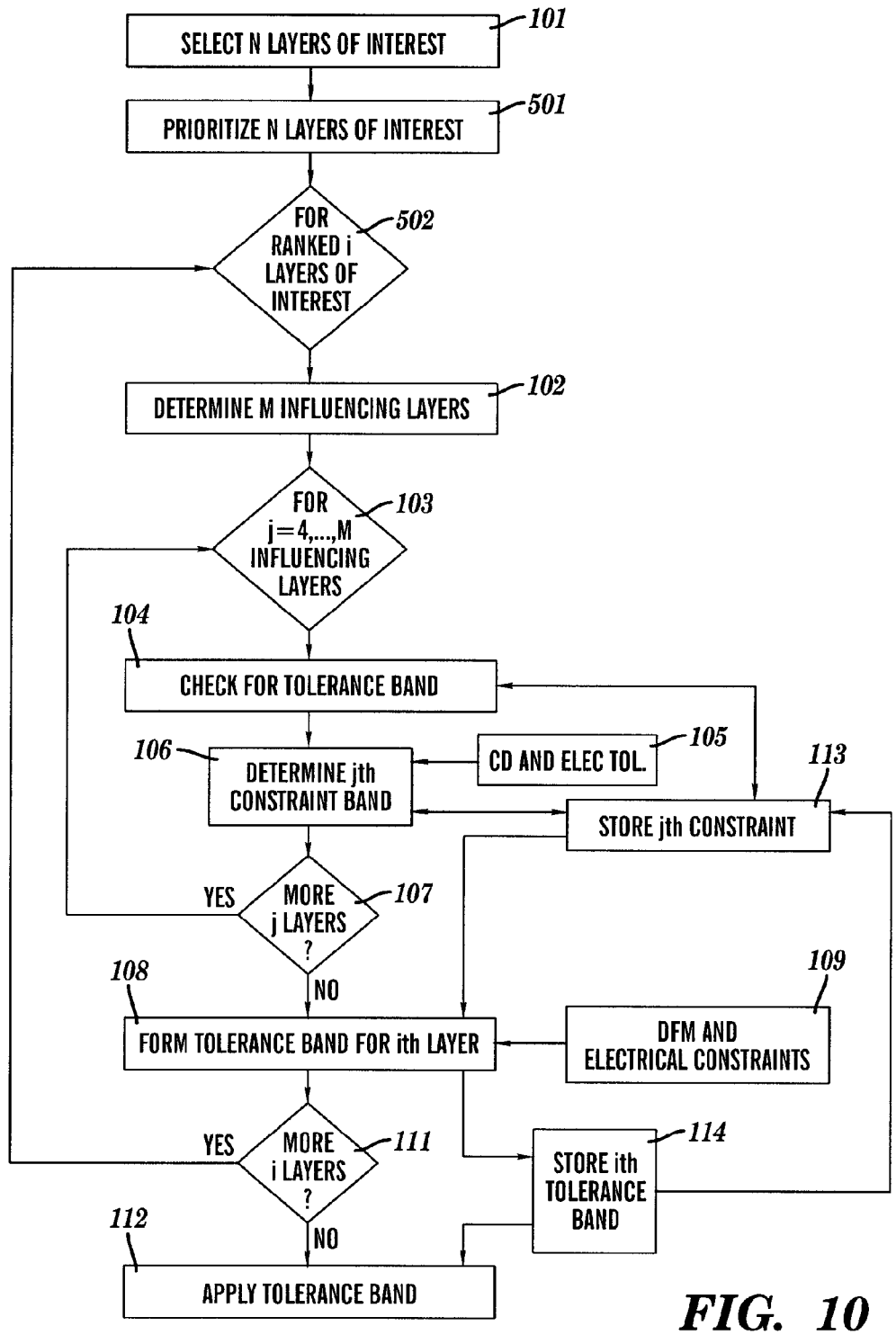
FIG. 10 is a schematic showing an alternative embodiment of the inventive method.

Alternative embodiments of the inventive method are also conceivable. In FIG. 10, additional steps may be added prior to performing the method of FIG. 1. For example, if the MBOPC correction for a given design is computed starting with the level where it is easiest to achieve the designer's intent and then moving toward the level where it is most difficult, it is possible that additional tolerance can be gained on the more difficult levels. In this embodiment, the relative difficulty in printing each layer of interest is ranked from easiest to hardest prior to creating the tolerance band (Block 501). For example, for layers having large process windows, tight tolerances are easier to achieve. The layers are then processed in the order of priority ranking (Block 502), so that the relatively easy layers are processed first. In some cases, this will result in more room for the difficult layers to fill in around the easier layers.

Figure 11:
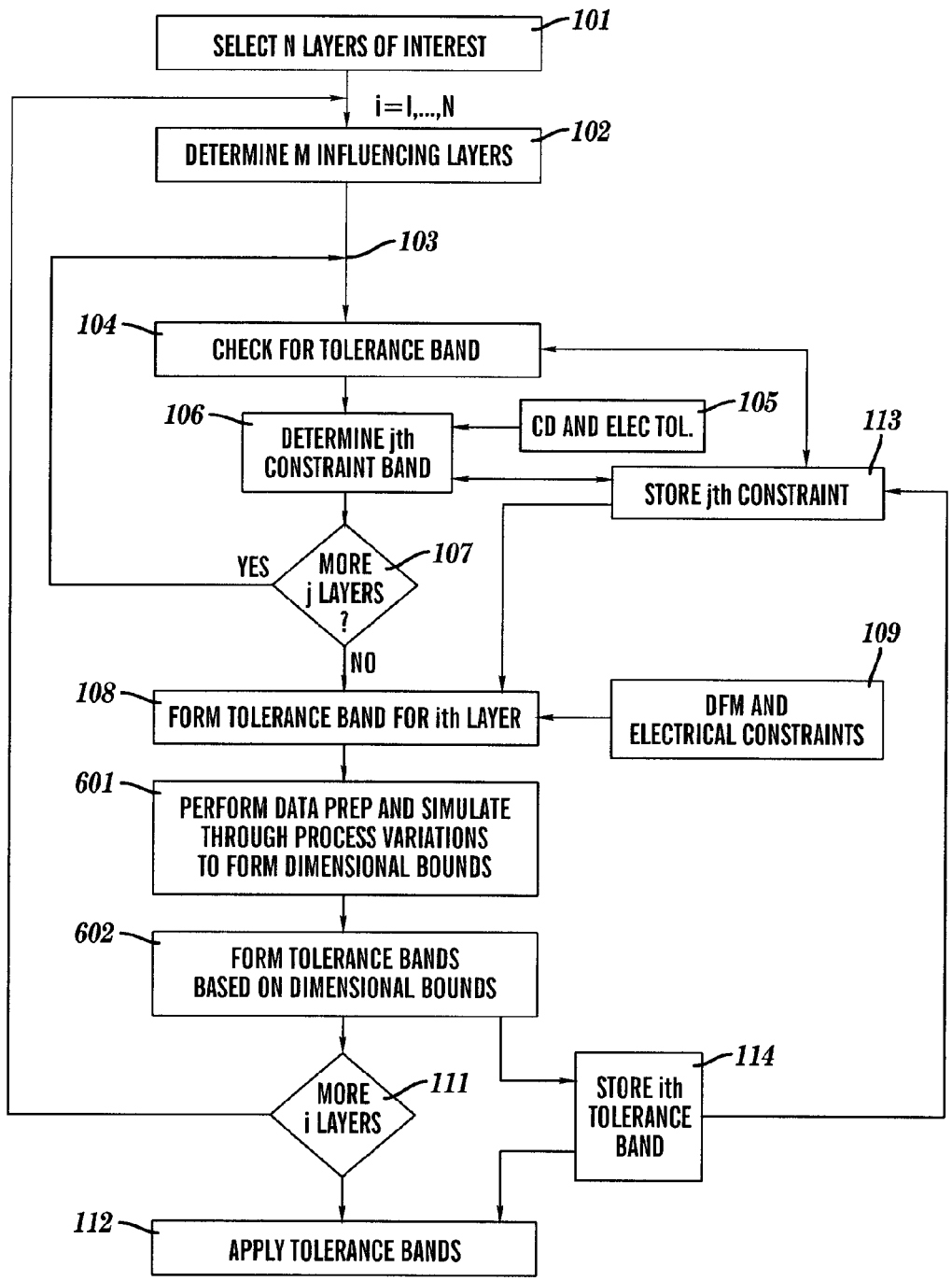
FIG. 11 is a schematic showing another alternative embodiment of the inventive method.

Another alternative embodiment of the inventive method is shown in FIG. 11, where additional steps are added to the embodiment of FIG. 1. Simulated dimensional bounds for the current layer of interest may be stored and used to create the constraining bands for other adjacent layers. In this way, if geometries for a given layer exhibit CD control that is better than the CD tolerance for that layer, this improved control can be taken advantage of to allow more variation on a subsequent layer. In this embodiment, once the tolerance bands for the layer of interest are determined, the layer is immediately run through the standard data preparation (DP), such as model based OPC (MBOPC), placement of sub-resolution assist features (SRAFs), etc., for that layer. The simulated results are analyzed under various process conditions to create the simulated dimensional bounds (Block 601). These simulated dimension bounds are then converted to shapes on the tolerance layer for the layer of interest, creating a new tolerance band for the layer (Block 602).

Figure 12:
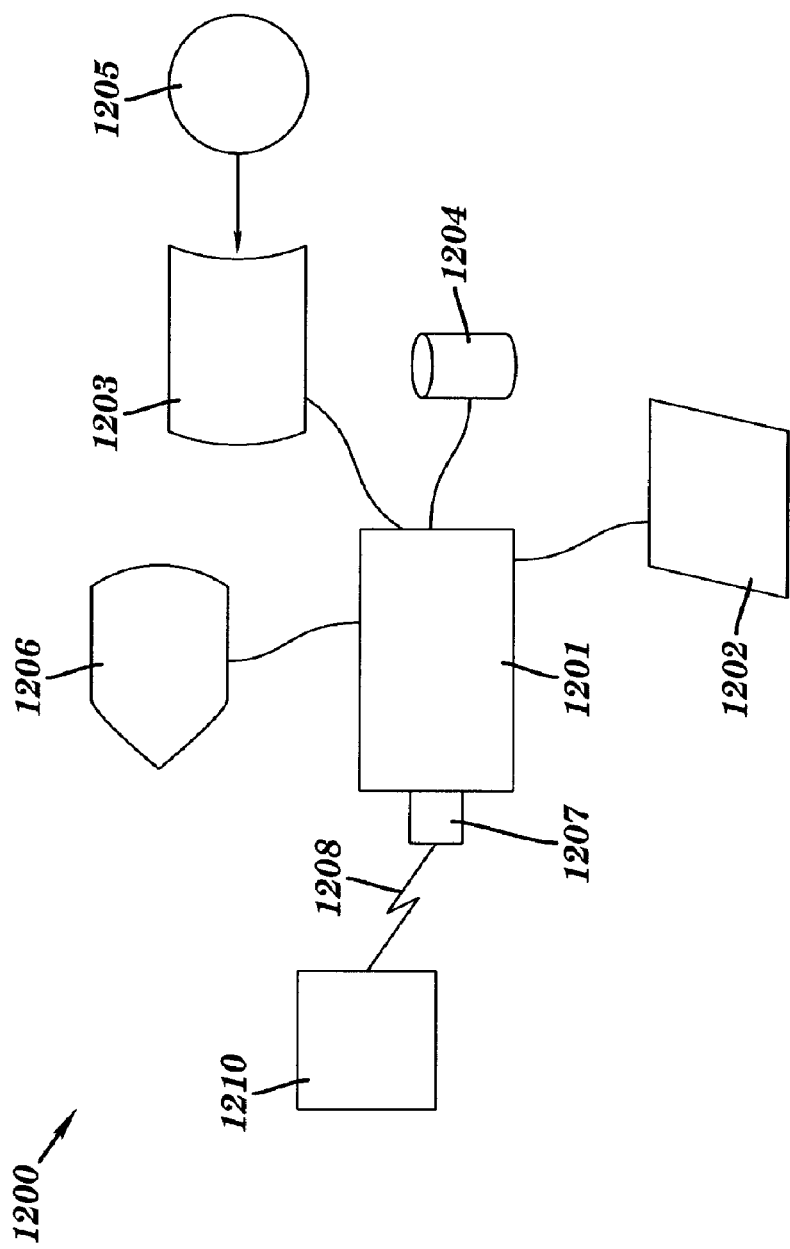
FIG. 12 is a schematic of a system for performing the method of the present invention, including a computer program product, a computer system, and a method of delivering the resulting tolerance bands to an end user.

The method of the present invention may be implemented as instructions in a computer program product or as part of a computer system. An example of a computer system 1200 configured to implement the method of the present invention is illustrated in FIG. 12, including a central processing unit (CPU) 1201 capable of executing the instructions, for example, as illustrated in FIGS. 1, 10 or 11. The CPU 1201 may be connected to an input/output device 1202, including but not limited to a keyboard, a mouse, or a reader, a display device 1206, such as a monitor, one or more storage devices 1204, 1203, which may include removable computer readable storage medium 1205 containing a computer program product comprising instructions for performing the inventive method. Alternatively, all or portions of the computer program product or the instructions may be provided to the CPU 1201 and/or stored on one or more of the storage devices 1203, 1204 by receiving instructions through a communications device 1207, including, but not limited to a wired device or a wireless device, which may send and receive information between the CPU 1201 or storage devices 1204, 1203 across a communications link 1208 to a remote device or system 1210. The remote device or system 1210 may, for example, be a tool for manufacturing lithographic masks, or may be located at a mask house where the mask design is to be manufactured, and the resulting mask tolerances or mask designs developed according to the inventive method may be transmitted to the mask house.

Alternatively, the tolerance and constraint bands developed in accordance with the invention may be provided, for example, as a design service, using a computer system 1200 via a communications link 1208 or on a removable medium 1205, to lithographic engineers or OPC engineers for use in designing the mask. The tolerance and constraint bands developed in accordance with the invention may also be provided as input to a variety of software tools, including but not limited to, an OPC tool, a mask design verification tool, a timing analysis tool and/or an electrical verification tool.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A method of designing a mask layout comprising the steps of:

providing a circuit design comprising a plurality of design layers comprising features arranged on a two-dimensional plane, said design layers aligned to one another along a third dimension;

identifying a selected one of said plurality of design layers including a critical feature to be formed on a substrate;

identifying a constraining region associated with an influencing feature on one of said plurality of design layers different than said selected design layer, wherein said influencing feature interacts with said critical feature, said constraining region being associated with one or more constraints;

determining a tolerance band associated with said critical feature, wherein said tolerance band defines a region within which said critical feature when formed on the substrate would satisfy a predetermined criterion, and wherein said tolerance band comprises an edge that is constrained in accordance with said one or more constraints associated with said constraining region pre-selecting a subset of said plurality of design layers so that each of said subset of layers comprises a critical feature;

ranking said subset according to a predetermined criterion prior to said step of identifying a selected one; and performing, for each of said subset in the order of said ranking, said step of identifying a selected one of said plurality of design layers, said step of identifying a constraining region, and said step of determining a tolerance band.

2. The method of claim 1 wherein said constraining region comprises a tolerance band associated with said influencing feature.

3. The method of claim 1 wherein said constraining region comprises nominal process bias, CD tolerance, or electrical tolerance for said influencing feature, or a combination thereof.

4. The method of claim 1 further comprising using said tolerance band as a constraining region if said critical feature on said selected one of said plurality of design layers becomes an influencing feature of a feature on a design layer different from said selected design layer.

5. The method of claim 1 wherein said constraining region further comprises:

CD tolerance for said influencing feature on said one of said plurality of design layers different than said selected design layer; and overlay tolerance of said influencing feature with respect to said critical feature on said selected one of said plurality of design layers.

6. The method of claim 1 wherein said constraining region further comprises:

a tolerance band for said influencing feature on said one of said plurality of design layers different than said selected design layer; and overlay tolerance of said influencing feature with respect to said critical feature on said selected one of said plurality of design layers.

7. The method of claim 1 wherein said one or more constraints vary within said constraining region.

8. The method of claim 7 wherein said one or more constraints comprise accounting for statistical process variations.

9. The method of claim 1 wherein said one or more constraints comprise accounting for statistical process variations.

10. The method of claim 1 wherein said ranking is performed in order of increasing difficulty of image processing.

11. The method of claim 1 further comprising performing a smoothing operation on said one or more constraints to form one or more smoothed constraints, and wherein said edge of said tolerance band is constrained in accordance with said one or more smoothed constraints.

12. A computer program product comprising a computer usable medium having a computer readable program embodied in said medium, wherein the computer readable program when executed on a computer causes the computer to perform the steps of:

providing a circuit design comprising a plurality of design layers comprising features arranged on a two-dimensional plane, said design layers aligned to one another along a third dimension;

identifying a selected one of said plurality of design layers including a critical feature to be formed on a substrate;

identifying a constraining region associated with an influencing feature on one of said plurality of design layers different than said selected design layer, wherein said influencing feature interacts with said critical feature, said constraining region being associated with one or more constraints;

determining a tolerance band associated with said critical feature, wherein said tolerance band defines a region within which said critical feature when formed on the substrate would satisfy a predetermined criterion, and wherein said tolerance band comprises an edge that is constrained in accordance with said one or more constraints associated with said constraining region;

pre-selecting a subset of said plurality of design layers so that each of said subset of layers comprises a critical feature;

ranking said subset according to a predetermined criterion prior to said step of identifying a selected one; and performing, for each of said subset in the order of said ranking, said step of identifying a selected one of plurality of design layers, said step of identifying a constraining region, and said step of determining a tolerance band.

13. The computer program product of claim 12 wherein said constraining region comprises a tolerance band associated with said influencing feature.

14. The computer program product of claim 12 wherein said constraining region comprises nominal process bias, CD tolerance, or electrical tolerance for said influencing feature, or a combination thereof.

15. The computer program product of claim 12 further comprising using said tolerance band as a constraining region if said critical feature on said selected one of said plurality of design layers becomes an influencing feature of a feature on a design layer different from said selected design layer.

16. The computer program product of claim 12 wherein said constraining region further comprises:

CD tolerance for said influencing feature on said one of said plurality of design layers different than said selected design layer; and overlay tolerance of said influencing feature with respect to said critical feature on said selected one of said plurality of design layers.

17. The computer program product of claim 12 wherein said constraining region further comprises:

a tolerance band for said influencing feature on said one of said plurality of design layers different than said selected design layer; and overlay tolerance of said influencing feature with respect to said critical feature on said selected one of said plurality of design layers.

18. The computer program product of claim 12 wherein said one or more constraints vary within said constraining region.

19. The computer program product of claim 18 wherein said one or more constraints comprise accounting for statistical process variations.

20. The computer program product of claim 12 wherein said one or more constraints comprise accounting for statistical process variations.

21. The computer program product of claim 12 wherein said ranking is performed in order of increasing difficulty of image processing.

22. The computer program product of claim 12 wherein said computer readable program further causes the computer to perform a smoothing operation on said one or more constraints to form one or more smoothed constraints, and wherein said edge of said tolerance band is constrained in accordance with said one or more smoothed constraints.

23. A method of conveying design parameters for use in a lithographic process comprising the steps of:
  providing a circuit design comprising a plurality of design layers comprising features arranged on a two-dimensional plane, said design layers aligned to one another along a third dimension;
  identifying a selected one of said plurality of design layers including a critical feature to be formed on a substrate;
  identifying a constraining region associated with an influencing feature on one of said plurality of design layers different than said selected design layer, wherein said influencing feature interacts with said critical feature, said constraining region being associated with one or more constraints;
  determining a tolerance band associated with said critical feature, wherein said tolerance band defines a region within which said critical feature when formed on the substrate would satisfy a predetermined criterion, and wherein said tolerance band comprises an edge that is constrained in accordance with said one or more constraints associated with said constraining region
  pre-selecting a subset of said plurality of design layers so that each of said subset of layers comprises a critical feature;
  ranking said subset according to a predetermined criterion prior to said step of identifying a selected one; and
  performing, for each of said subset in the order of said ranking, said step of identifying a selected one of said plurality of design layers, said step of identifying a constraining region, and said step of determining a tolerance band.

24. The method of claim 23 wherein said constraining region comprises a tolerance band associated with said influencing feature.

25. The method of claim 23 wherein said constraining region comprises nominal process bias, CD tolerance, or electrical tolerance for said influencing feature, or a combination thereof.

26. The method of claim 23 further comprising using said tolerance band as a constraining region if said critical feature on said selected one of said plurality of design layers becomes an influencing feature of a feature on a design layer different from said selected design layer.

27. The method of claim 23 wherein said constraining region further comprises:
  CD tolerance for said influencing feature on said one of said plurality of design layers different than said selected design layer; and
  overlay tolerance of said influencing feature with respect to said critical feature on said selected one of said plurality of design layers.

28. The method of claim 23 wherein said constraining region further comprises:
  a tolerance band for said influencing feature on said one of said plurality of design layers different than said selected design layer; and
  overlay tolerance of said influencing feature with respect to said critical feature on said selected one of said plurality of design layers.

29. The method of claim 23 wherein said one or more constraints vary within said constraining region.

30. The method of claim 29 wherein said one or more constraints comprise accounting for statistical process variations.

31. The method of claim 23 wherein said one or more constraints comprise accounting for statistical process variations.

32. The method of claim 23 wherein said ranking is performed in order of increasing difficulty of image processing.

33. The method of claim 23 farther comprising providing said tolerance band for use in designing a mask layout.

34. The method of claim 23 farther comprising providing said tolerance band to any of a lithographic engineer, an OPC engineer, a mask manufacturer, a mask manufacturing tool or a software tool.

35. The method of claim 34 wherein said software tool is selected from the group consisting of an OPC tool, a mask design verification tool, a timing analysis tool, an electrical verification tool or a combination thereof.

36. The method of claim 23 farther comprising performing a smoothing operation on said one or more constraints to form one or more smoothed constraints, and wherein said edge of said tolerance band is constrained in accordance with said one or more smoothed constraints.

* * * * *